US012481046B2

(12) United States Patent
Manacorda et al.

(10) Patent No.: US 12,481,046 B2
(45) Date of Patent: Nov. 25, 2025

(54) METHOD FOR SAMPLING AN ULTRA WIDE BAND SIGNAL

(71) Applicant: IDS GEORADAR S.R.L., Milan (IT)

(72) Inventors: Guido Manacorda, Pisa (IT); Davide Pasculli, Leghorn (IT); Alessandro Simi, Leghorn (IT)

(73) Assignee: IDS GEORADAR S.R.L., Milan (IT)

( * ) Notice: Subject to any disclaimer, the term of this patent is extended or adjusted under 35 U.S.C. 154(b) by 225 days.

(21) Appl. No.: 17/761,099

(22) PCT Filed: Sep. 17, 2020

(86) PCT No.: PCT/IB2020/058661
§ 371 (c)(1),
(2) Date: Mar. 16, 2022

(87) PCT Pub. No.: WO2021/053567
PCT Pub. Date: Mar. 25, 2021

(65) Prior Publication Data
US 2022/0350007 A1    Nov. 3, 2022

(30) Foreign Application Priority Data

Sep. 17, 2019  (IT) .................. 102019000016562

(51) Int. Cl.
*G01S 13/02* (2006.01)
*G01S 7/34* (2006.01)
(Continued)

(52) U.S. Cl.
CPC ............ *G01S 13/0209* (2013.01); *G01S 7/34* (2013.01); *G01S 13/885* (2013.01); *H04B 1/0003* (2013.01)

(58) Field of Classification Search
CPC ...... G01S 13/0209; G01S 7/34; G01S 13/885; H04B 1/0003; H03M 1/1265
See application file for complete search history.

(56) References Cited

U.S. PATENT DOCUMENTS 7,848,456 B2 * 12/2010 Merz .................. H04B 1/71632
375/310
8,884,807 B1 * 11/2014 Johansson ................ G01V 3/12
342/21
(Continued)

FOREIGN PATENT DOCUMENTS

EP    1 238 501 A1    9/2002
EP    1919147 A1 *   5/2008   ......... H04B 1/71635

OTHER PUBLICATIONS

S. Dai, L. Liu and G. Fang, "A low-cost handheld integrated UWB radar for shallow underground detection", 2010 IEEE International Conference on Ultra-Wideband, Nanjing, China, 2010, pp. 1-4. (Year: 2010).*

(Continued)

*Primary Examiner* — Yuwen Pan
*Assistant Examiner* — Swati Jain
(74) *Attorney, Agent, or Firm* — Maschoff Brennan

(57) ABSTRACT

A method for sampling an Ultra Wide Band signal comprising a step of prearranging a GPR antenna comprising at least one transmitter and one receiver, a variable-gain amplifier, or VGA, a A/D converter and a control unit. The method then comprises the steps of transmitting and receiving a primary Ultra Wide Band signal by the GPR antenna and sampling values of the primary signal relative to a first full-scale portion by the A/D converter. The method also comprises the steps of transmitting and receiving at least one secondary Ultra Wide Band signal by the GPR antenna, amplifying said or each secondary signal by the variable-gain amplifier, and sampling values of said or each secondary signal relative to full-scale portions different from the first portion by the A/D converter.

5 Claims, 7 Drawing Sheets

(51) Int. Cl.
*G01S 13/88* (2006.01)
*H04B 1/00* (2006.01)

(56) References Cited

U.S. PATENT DOCUMENTS

| | | | |
|---|---|---|---|
| 9,057,782 B2 * | 6/2015 | Feigin | G01S 7/2923 |
| 2007/0116104 A1 * | 5/2007 | Fujiwara | H04B 1/7183 |
| | | | 375/355 |
| 2010/0195699 A1 * | 8/2010 | Liu | H04B 1/7176 |
| | | | 375/130 |
| 2016/0259045 A1 * | 9/2016 | Huston | H01Q 13/085 |
| 2019/0154826 A1 * | 5/2019 | Huston | H01Q 13/085 |

OTHER PUBLICATIONS

M. Yan, M. Tian, L. Gan and X. Chen, "Impulse Ground Penetrating Radar Hardware System Design", 2006 6th International Conference on ITS Telecommunications, Chengdu, China, 2006, pp. 1244-1247. (Year: 2006).*

C.-M. Lai, K.-W. Tan, Y.-J. Chen and T.-S. Chu, "A UWB Impulse-Radio Timed-Array Radar With Time-Shifted Direct-Sampling Architecture in 0.18-μm CMOS", IEEE Transactions on Circuits and Systems I: Regular Papers, vol. 61, No. 7, pp. 2074-2087, Jul. 2014 (Year: 2014).*

\* cited by examiner

METHOD FOR SAMPLING AN ULTRA WIDE BAND SIGNAL

FIELD OF THE INVENTION

The present invention relates to the field of surveys by means of GPR (Ground Penetrating Radar) technique.

In particular, the invention relates to a method for sampling an Ultra Wide Band signal.

DESCRIPTION OF THE PRIOR ART

As known, the signals emitted and received by a GPR (Ground Penetrating Radar) sensor are of the Ultra Wide Band (UWB) type, i.e. they are characterized by a −10 dB band of at least 500 Hz, or a −10 dB equal to at least 20% of the center frequency on which this band is measured. Band at −10 dB is the difference between the highest and lowest frequency for which the power spectral density is 10 dB lower than the maximum.

The main limitation of the prior art for sampling, in the time domain, of UWB signals is given by the sampling rate of Analog-Digital converters (ADC). In fact, to receive a signal correctly, the converter must have a sampling rate equal to at least double the maximum frequency of the signal (Nyquist sampling theorem). Therefore, a very high speed A/D converter must be used for a UWB signal, i.e. with a sampling frequency that can be a few GHz and analogical band sufficient to meet the Nyquist condition.

With reference to FIG. 2, some solutions present in the prior art are listed below.

A first solution present in the prior art provides the acquisition of the signal by means of the so-called "equivalent-time sampling" or "stroboscopic sampling", which consists in transmitting a multiplicity of consecutive pulses, and for each of these collecting only one sample at a time. An example of this method is shown in US2010195699.

Such acquisition method is typically characterized by a high sensitivity, or dynamic range (DR), i.e. the ratio between the maximum and minimum signals that can be received by the system.

In particular, the dynamic range can be defined as follows:

$$DR \sim \eta * G_{AV} * D_{RX}$$

wherein $\eta$ is a factor that identifies the sampling efficiency (typically it is approximately equal to 1);

$G_{AV}$ is the gain due to the possible application of the "stacking" technique, which involves making an average of the signals acquired consecutively, in order to reduce the noise power of the received signal;

$D_{RX} \sim 1.76 + 6.02 * ENOB$ dB is the dynamic range expressed by the A/D converter only, i.e. by the ENOB number ("Effective Number of Bits").

A greater dynamic range results in a greater ability of the GPR to detect very weak signals. Since this return signal is strongly attenuated by the ground, a high sensitivity of the receiver basically indicates the ability of the GPR to locate objects at greater depths.

However, the stroboscopic sampling has the disadvantage of requiring numerous consecutive transmissions for the correct acquisition and reconstruction of the signal.

In particular, the number of samples $N_S$ that have to be taken is dictated by the Nyquist condition:

$$N_S > 2 * TFS * f_{max}$$

wherein

TFS is the maximum instrumental full-scale or the width of the reception window beyond which any return signals are ignored by the GPR;

$f_{max}$ is the maximum frequency of the signal UWB to the receiver.

Since, in the prior art, stroboscopic sampling involves the acquisition of only one sample at a time, the total time required for sampling the received signal is given by:

$$T_{tot} = N_S * PRI = N_S * 1/PRF$$

wherein

PRI is the "Pulse Repetition Interval", i.e. the time between a transmission and the successive;

PRF=1/PRI is the "Pulse Repetition Frequency", i.e. the repetition frequency of the transmission.

Therefore, the aforesaid sampling method, in the face of good sensitivity, involves very long signal acquisition and reconstruction times, i.e. equal to at least $N_S$ times the transmission time of a pulse.

An alternative approach present in the prior art is the so-called "real-time sampling", which allows a much faster acquisition than that in equivalent time, as it uses an A/D converter with a sufficiently high speed to correctly sample the UWB signal in a single transmission-reception of the radar pulse, therefore such as to respect the Nyquist condition on the maximum frequency of the received signal.

However, due to technological limitations, as the sampling rate increases, the ENOB value (and therefore the dynamic range) of the A/D converters decreases. Therefore, the sensitivity of GPR using this technology is much lower than that obtainable by sampling in equivalent time.

To overcome the aforementioned drawbacks, a hybrid solution ("pseudo-stroboscopic" or "pseudo real-time sampling") is described in U.S. Pat. Nos. 8,884,807 and 9,057,782, which makes use of faster A/D converters than those used in equivalent time sampling, acquiring however a multitude of samples for each signal received.

However, even this hybrid solution requires a certain number of repetitions of the transmission of impulses, resulting in any case slower than real-time sampling.

SUMMARY OF THE INVENTION

It is therefore an object of the present invention to provide a method for sampling an Ultra Wide Band signal that allows the reconstruction of the signal in a much shorter time than equivalent-time sampling or pseudo-stroboscopic sampling, while ensuring a dynamic range that is not less than these methods, in order to guarantee the detection of objects at great depths.

It is also an object of the present invention to provide such a method that allows the possibility of further increasing the dynamic range of the system by means of the "stacking" technique.

It is also an object of the present invention to provide such a method that allows multi-channel GPR acquisition, i.e. through a plurality of GPR antennas, while maintaining the same efficiency of the single channel.

These and other objects are achieved by a method for sampling an Ultra Wide Band signal according to claims 1 to 5.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

Figure 1:
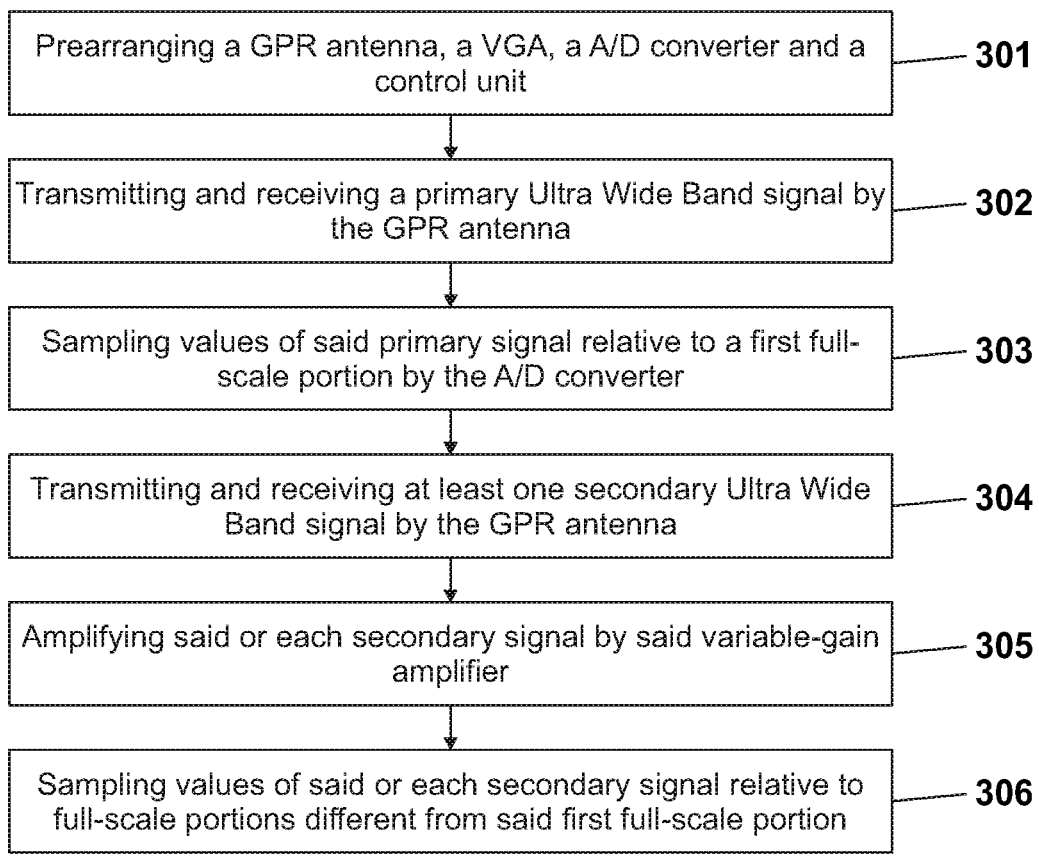
FIG. 1 shows, in a flow diagram, the subsequent steps of the method for sampling an Ultra Wide Band signal, according to the present invention.
Figure 2:
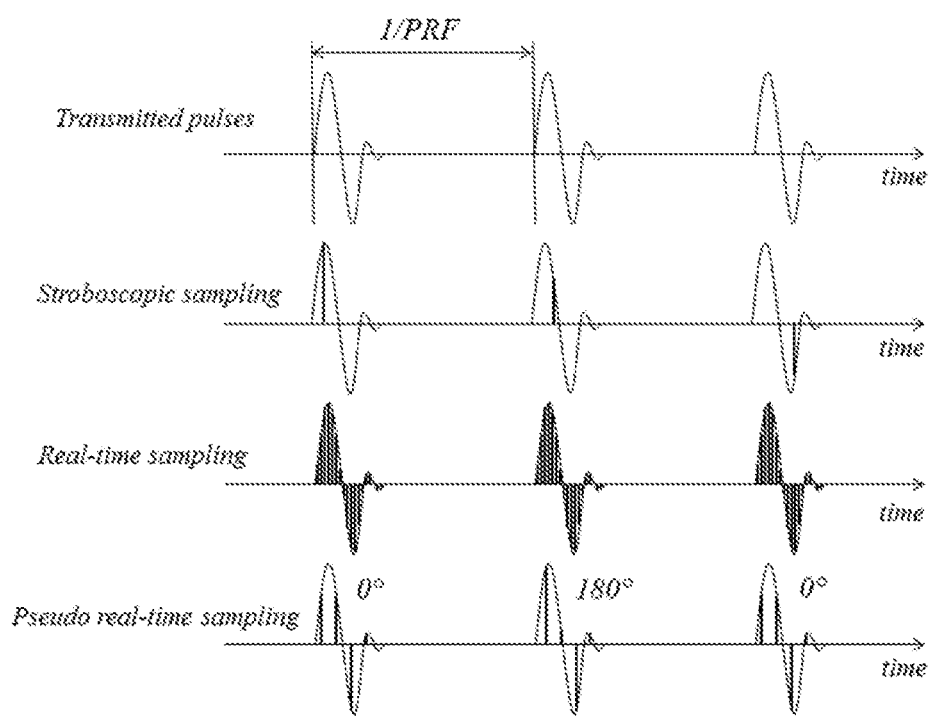
FIG. 2 shows the various types of sampling a signal present in prior art.

With reference to FIG. 1, a method for sampling an Ultra Wide Band signal comprises a first step of prearranging an apparatus comprising a GPR antenna, a variable-gain amplifier or VGA, a A/D converter and a control unit [301].

Figure 3:
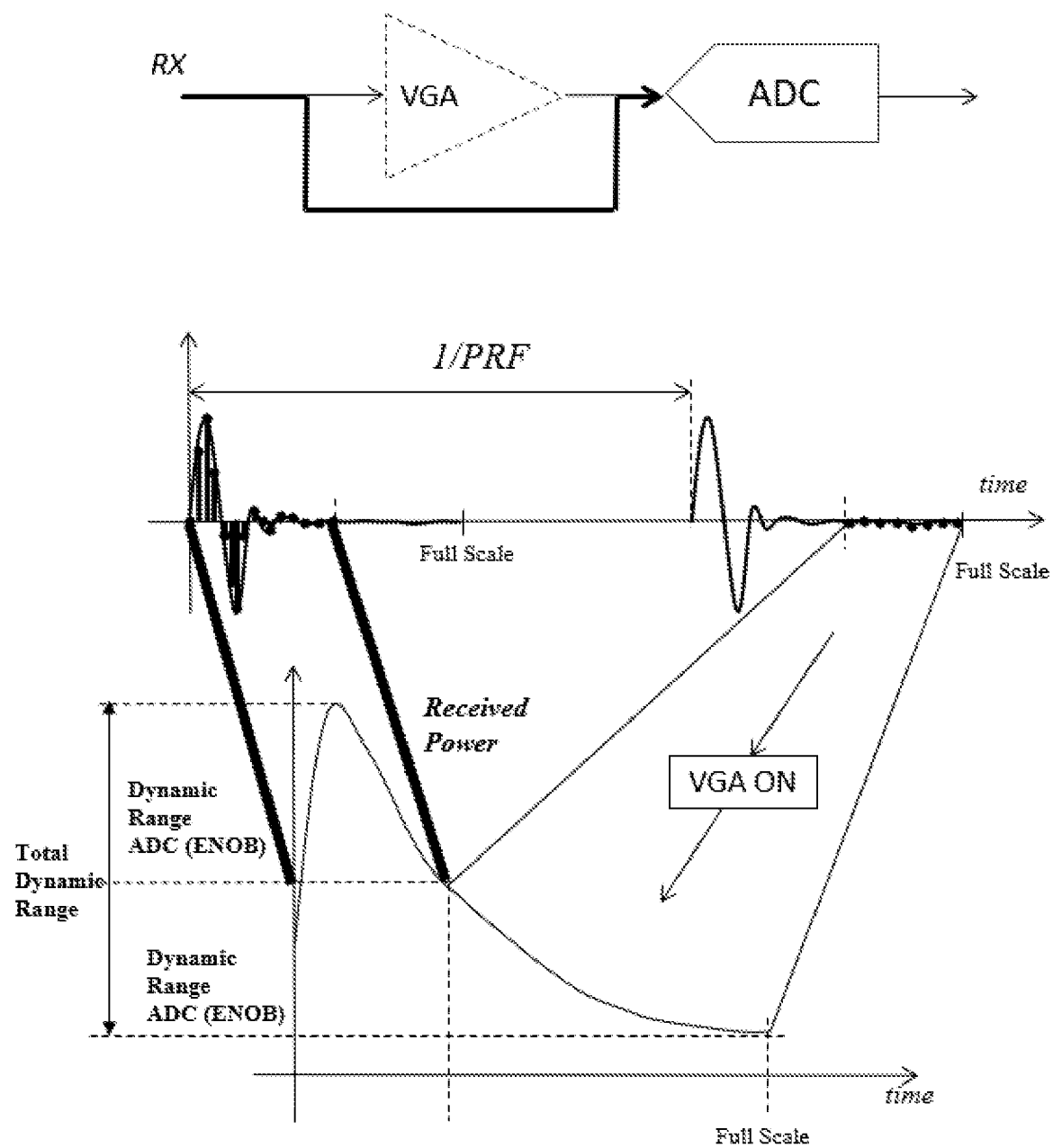
FIG. 3 shows the step of sampling values relative to a first full-scale portion.
Figure 5A:
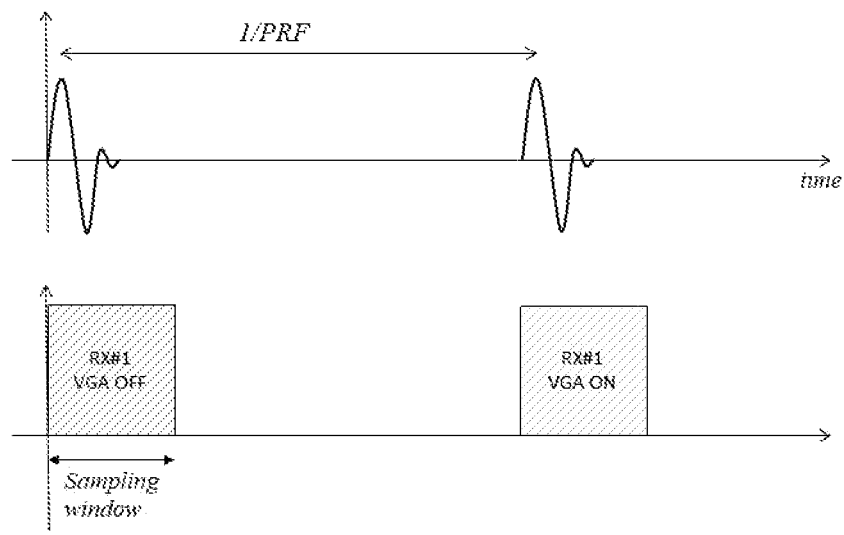
FIGS. 5A and 5B schematically show the operating principle of a first embodiment of the method for sampling an Ultra Wide Band signal, in which a transmitter and a receiver are used.
Figure 5B:
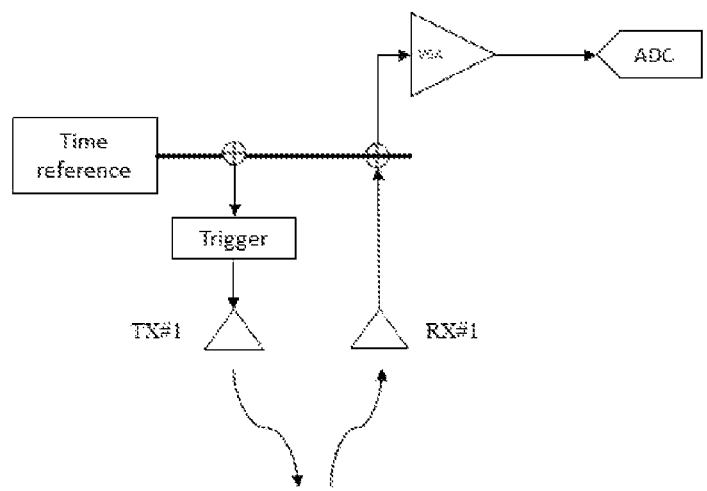

With reference also to FIGS. 3, 5A and 5B, then follow the steps of transmitting and receiving a primary Ultra Wide Band signal by the GPR antenna [302] and of sampling of values of the primary signal relative to a first full-scale portion by the A/D converter [303]. In such steps the VGA is therefore deactivated, as schematically shown in FIGS. 3 and 5A.

Figure 4:
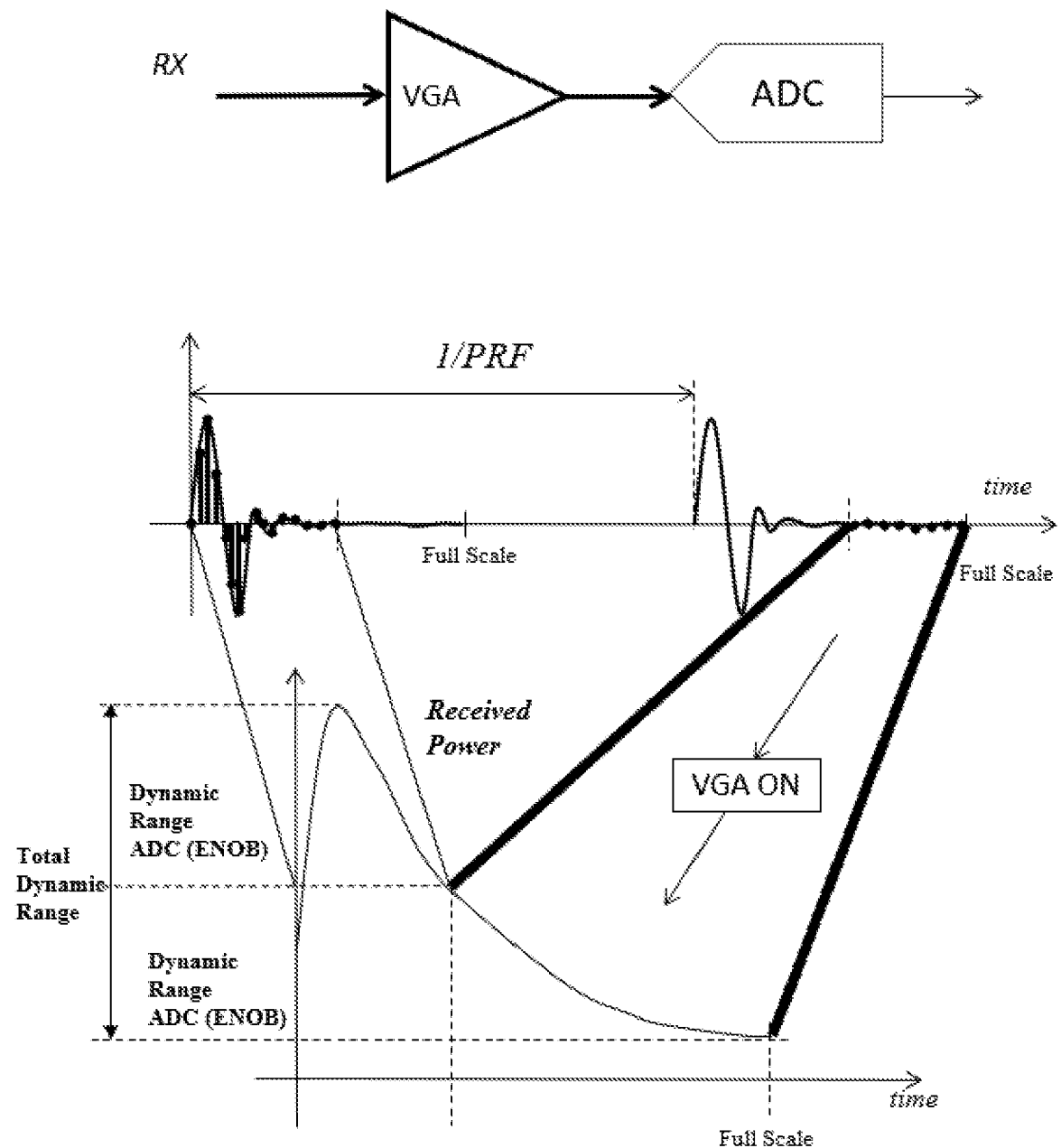
FIG. 4 shows the step of sampling values relative to a second full-scale portion.

With reference also to FIG. 4, the VGA is then activated and the method provides the steps of transmitting and receiving at least one secondary Ultra Wide Band signal by the GPR antenna [304], amplifying the secondary signal by the VGA [305] and sampling of values of the secondary signal relative to a second full-scale portion, different from the first portion, by the A/D converter [306].

Depending on the dynamic range of the signal, and on the sampling requirements, the steps [304], [305] and [306] can then be repeated again with more than one secondary signal, dividing the full-scale of the signal into respective portions.

The method, according to the present invention, then provides the division of the full-scale of the signal into two or more portions, in order to sample the first portion without amplification and then proceed with the amplification and the sampling of the subsequent portions.

This allows the sampling of UWB signals in very short times with respect to the methods of the prior art while preserving a high dynamic range. In particular, the time required for the above method is proportional to the number of transmissions/receptions of the signal and, therefore, to the number of portions into which the full-scale of the signal is to be divided.

Furthermore, the method according to the present invention provides the possibility of repeating the steps of transmitting and receiving of both the primary signal and each secondary signal, with subsequent average of the signals, so as to be able to implement the "stacking" technique to further increase the dynamic range.

In particular, at least two sampling steps of the values of the primary signal and at least two sampling steps of the values of each secondary signal can be provided, to implement the "pseudo-stroboscopic" mode.

Furthermore, the method according to the present invention can provide prearranging a GPR antenna comprising n≥2 transmitters and m≥2 receivers, in order to allow a superimposed transmission/reception of signals by the transmitter/receiver couples.

Figure 6A:
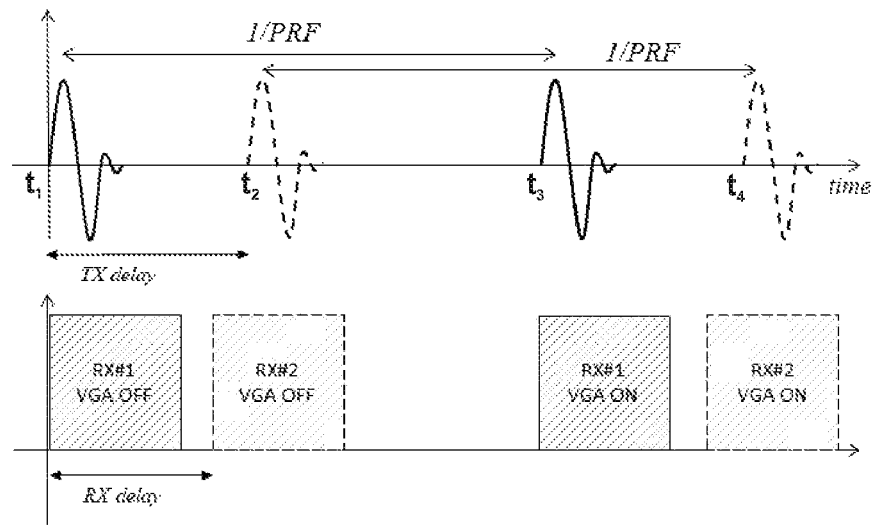
FIGS. 6A and 6B schematically show the operating principle of a second embodiment of the method for sampling an Ultra Wide Band signal, in which two transmitters and two receivers are used for the transmission/reception of two primary signals and two secondary signals.
Figure 6B:
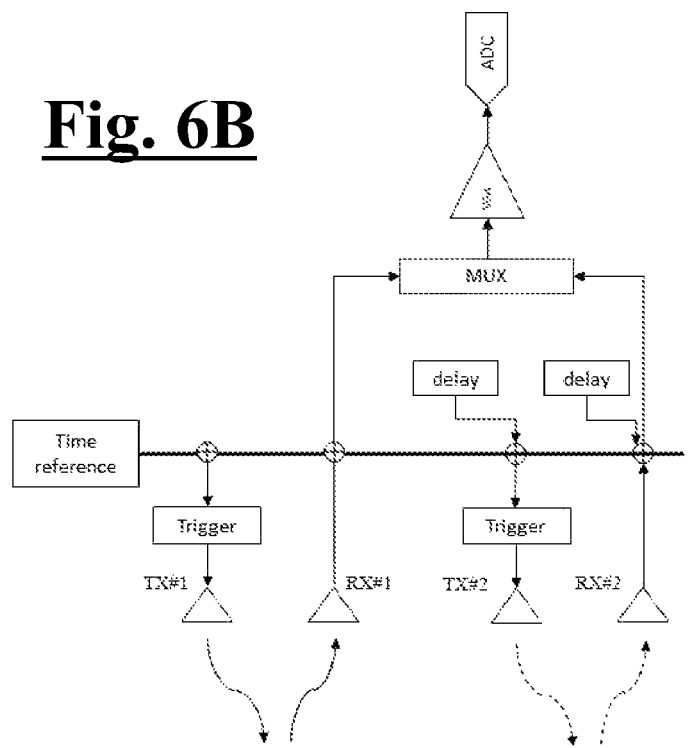

In particular, in the exemplary embodiment of FIGS. 6A and 6B, the method provides prearranging a GPR antenna comprising 2 transmitters and 2 receivers, used for the transmission/reception and the sampling of two primary and two secondary signals, subsequently superimposed to implement the stacking technique.

In particular, at a time $t_1$ there is a step of transmitting and receiving a primary signal from a first couple of transmitter/receiver, with following sampling of values of the primary signal, and at a time $t_2$<PRI=1/PRF there is a step of transmitting and receiving an auxiliary primary signal by a second couple of transmitter/receiver, with following sampling of values of the auxiliary primary signal.

At a time $t_3 = t_1 + PRI$ there is then the step of transmitting and receiving a secondary signal by the first couple of transmitter/receiver, with consequent amplification and sampling of values, and at a time $t_4 = t_2 + PRI$ there is the step of transmitting and receiving an auxiliary secondary signal by the second couple of transmitter/receiver, with consequent amplification and sampling of values.

This way, it is possible to repeat the sampling steps of the primary and secondary signal, thus obtaining a number of overlapping signals to obtain a more accurate sampling, exploiting the PRI delay between the transmission/reception of two signals made by a transmitter/receiver couple. Typically, in fact, the time between one pulse and the next (PRI) is several orders of magnitude greater than the maximum delay identifiable by the radar (full-scale). For this reason it is possible to transmit and receive with multiple channels, placing them temporally separated.

Figure 7A:
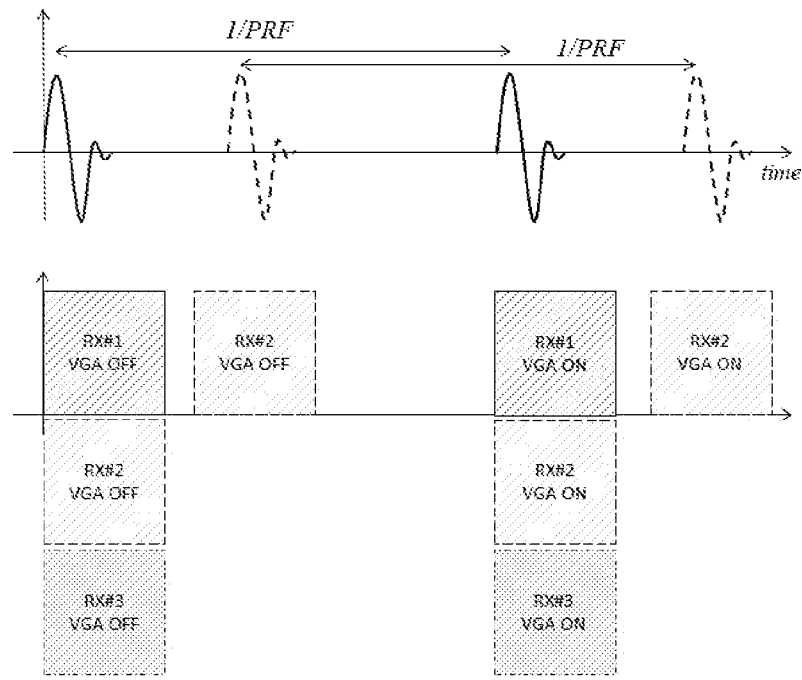
FIGS. 7A and 7B schematically show the operating principle of a third embodiment of the method for sampling an Ultra Wide Band signal, in which two transmitters and three receivers are used.
Figure 7B:
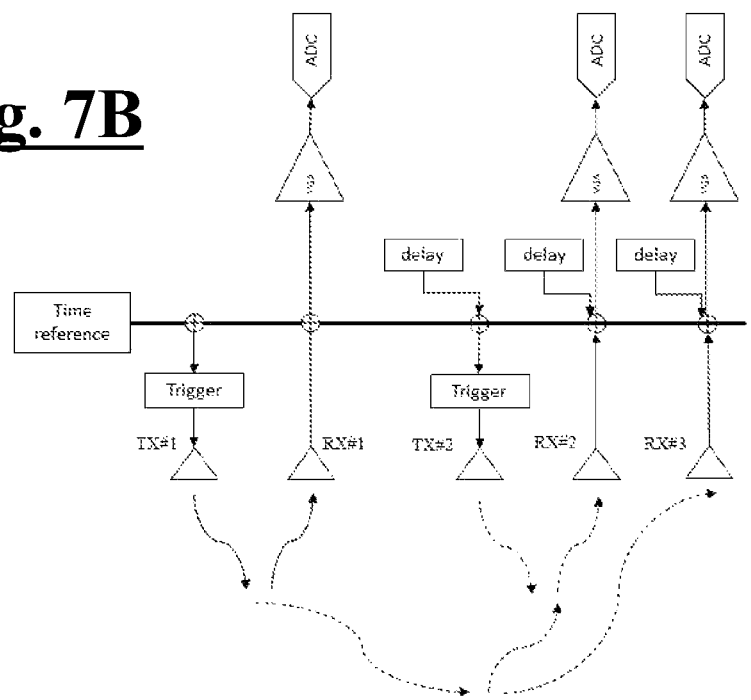

With reference to FIGS. 7A and 7B, a further possibility is to have a number of receivers higher than the number of transmitters (m>n) and simultaneously acquire the signal generated by a single transmitter by means of multiple receiving elements.

This is possible by using a common time reference for each transmitter or receiver element that makes up the system, and by setting an individual programmable delay for receiving the same signal between two or more different receivers.

The invention claimed is:
1. A method for sampling an Ultra Wide Band signal comprising the steps of:
  prearranging:
    a Ground Penetrating Radar, or GPR antenna comprising at least one transmitter and one receiver;
    a variable-gain amplifier, or VGA;
    a A/D converter;
    a control unit;
  transmitting and receiving a primary Ultra Wide Band signal by said GPR antenna;
  sampling values of said primary signal relative to a first full-scale portion by said A/D converter;
said method characterized in that it also comprises the steps of:

transmitting and receiving at least one secondary Ultra Wide Band signal by said GPR antenna;

amplifying said or each secondary signal by said variable-gain amplifier;

sampling values of said or each secondary signal relative to full-scale portions different from said first full-scale portion by said A/D converter.

2. The method for sampling an Ultra Wide Band signal, according to claim 1, wherein an iteration of said steps of transmitting and receiving a primary signal and at least one secondary signal is provided and wherein a step is also provided of superposing and mediating said received signals for reducing the noise.

3. The method for sampling an Ultra Wide Band signal, according to claim 1, wherein at least two steps of sampling values of said primary signal and at least two steps of sampling values of said or each secondary signal are provided.

4. The method for sampling an Ultra Wide Band signal, according to claim 1, wherein said GPR antenna comprises $n \geq 2$ transmitters and $m \geq 2$ receivers.

5. The method for sampling an Ultra Wide Band signal, according to claim 4, wherein the steps are provided of:

transmitting and receiving a primary Ultra Wide Band signal by a first couple of transmitter/receiver at a time $t_1$;

sampling values of said primary signal relative to a first full-scale portion by said A/D converter;

transmitting and receiving an auxiliary primary Ultra Wide Band signal by at least one second couple of transmitter/receiver at a time $t_2 < PRI = 1/PRF$, where PRI represents the "Pulse Repetition Interval", i.e. the time between a transmission and the successive, and PRF=1/PRI represents the "Pulse Repetition Frequency", i.e. the repetition frequency of the transmission;

sampling values of said auxiliary primary signal relative to a first full-scale portion by said A/D converter;

transmitting and receiving at least one secondary Ultra Wide Band signal by said first couple of transmitter/receiver at a time $t_3 = t_1 + PRI$;

amplifying said or each secondary signal by said variable-gain amplifier;

sampling values of said or each secondary signal relative to full-scale portions different from said first full-scale portion from said A/D converter;

transmitting and receiving at least one auxiliary secondary Ultra Wide Band signal by said second couple of transmitter/receiver at a time $t_4 = t_2 + PRI$;

amplifying said or each auxiliary secondary signal by said variable-gain amplifier;

sampling values of said or each auxiliary secondary signal relative to full-scale portions different from said first full-scale portion from said A/D converter.

* * * * *